United States Patent Office.

JOHN ARBUCKLE, JR., OF ALLEGHENY CITY, PENNSYLVANIA.

Letters Patent No. 73,486, dated January 21, 1868.

IMPROVEMENT IN ROASTED COFFEE.

The Schedule referred to in these Letters Patent and making part of the same.

TO ALL WHOM IT MAY CONCERN:

Be it known that I, JOHN ARBUCKLE, Jr., of the city and county of Allegheny, in the State of Pennsylvania, have invented a new and useful Improvement in "Roasted Coffee;" and I do hereby declare that the following is a full and exact description thereof.

The nature of my invention consists in roasting coffee and then coating it with a glutinous or gelatinous matter, for the purpose of retaining the aroma of the coffee, and also act as a clarifying-agent when the ground coffee has been boiled in water.

To enable others skilled in the art of "roasting coffee" to use my invention, I will proceed to describe its operation or preparation.

I take any good article of green coffee, and roast it by any of the known means. I then cool it as quickly as possible. I then prepare a mixture of the following ingredients, in about the following proportions: One ounce of Irish moss; half an ounce of isinglass; half an ounce of gelatine; one ounce of white sugar; and twenty-four eggs. I boil the Irish moss in a quart of water, and then strain it. I then boil the isinglass and gelatine in a pint of water. I then mix the sugar and eggs well together, and when the mixture of Irish moss, isinglass, gelatine, and water has become cold, I mix the whole of the ingredients into one homogeneous compound. I then pour the whole over about one hundred pounds of the roasted coffee, and stir and so manipulate the coffee that each grain will be entirely coated, after the coffee is coated, and the coating has become dry and hard, which is accomplished by forcing currents of air through it while stirring it, for the purpose of coating it with the glutinous or gelatinous matter described.

I wish it clearly understood that I do not confine myself to the above compound of glutinous matter for coating roasted coffee, for many other compounds may be formed which will accomplish the end desired, to wit. coating roasted coffee in the manner and for the purpose set forth.

What I claim, is—

Coating roasted coffee with any glutinous or gelatious matter, for the purpose of retaining the aroma of the coffee, and also act as a clarifying-agent, as herein described and set forth.

JOHN ARBUCKLE, JR.

Witnesses:
JAMES J. JOHNSTON,
A. C. JOHNSTON.